United States Patent
Chien et al.

(10) Patent No.: US 10,641,440 B2
(45) Date of Patent: May 5, 2020

(54) LIGHT-EMITTING HOUSING

(71) Applicant: PEGATRON CORPORATION, Taipei (TW)

(72) Inventors: Hung-Wen Chien, Taipei (TW); Yu-Te Lin, Taipei (TW); Yi-Lung Lin, Taipei (TW); Chih-Yung Wang, Taipei (TW)

(73) Assignee: PEGATRON CORPORATION, Taipei (TW)

(*) Notice: Subject to any disclaimer, the term of this patent is extended or adjusted under 35 U.S.C. 154(b) by 0 days.

(21) Appl. No.: 16/365,988

(22) Filed: Mar. 27, 2019

(65) Prior Publication Data
US 2019/0360645 A1 Nov. 28, 2019

(30) Foreign Application Priority Data
May 24, 2018 (TW) .............................. 107117821 A

(51) Int. Cl.
*F21K 9/65* (2016.01)
*H02K 5/02* (2006.01)
*F21K 9/61* (2016.01)

(52) U.S. Cl.
CPC .................. *F21K 9/65* (2016.08); *F21K 9/61* (2016.08); *H02K 5/02* (2013.01)

(58) Field of Classification Search
CPC .... F21K 9/65; F21K 9/61; H05K 5/02; G02B 6/004; G02B 6/0051; G02F 1/133615; G02F 13/00; G02F 13/18
See application file for complete search history.

(56) References Cited

U.S. PATENT DOCUMENTS

| 7,223,008 B2 * | 5/2007 | Henriet | G02B 6/0018 362/602 |
| 8,480,287 B2 * | 7/2013 | Pan | G02B 6/0085 362/632 |

(Continued)

FOREIGN PATENT DOCUMENTS

| CN | 201365379 Y | 12/2009 |
| CN | 102374416 A | 3/2012 |
| CN | 105082869 A | 11/2015 |

OTHER PUBLICATIONS

Office Action issued on Taiwan Patent Application No. 107117821 dated Jul. 31, 2018.

*Primary Examiner* — Peggy A Neils
(74) *Attorney, Agent, or Firm* — McClure, Qualey & Rodack, LLP.

(57) ABSTRACT

A light-emitting housing is disclosed. The light-emitting housing includes a light-emitting module and a housing. The light-emitting module includes a light guide plate and at least one light-emitting unit. The light guide plate includes an upper surface, a lower surface, and a plurality of dot regions, the dot regions are located on the lower surface, and the at least one light-emitting unit provides a plurality of light beams incident to the light guide plate. The housing is disposed above the light-emitting module and located on the upper surface of the light guide plate, and the housing includes at least one transparent region. Some of the light beams emitted by the at least one light-emitting unit are reflected through the dot regions and penetrate the upper surface of the light guide plate and the at least one transparent region. In this way, from the outside of the housing, the light beams penetrating the at least one transparent region can be observed, and a visual effect that a specific position on the housing emits light is generated.

14 Claims, 5 Drawing Sheets

(56) References Cited

U.S. PATENT DOCUMENTS

| | | | | |
|---|---|---|---|---|
| 2004/0005451 | A1* | 1/2004 | Kretman | C08J 5/18 |
| | | | | 428/317.9 |
| 2008/0285308 | A1* | 11/2008 | Clary | G02B 6/004 |
| | | | | 362/619 |
| 2014/0133177 | A1* | 5/2014 | Miller | G02B 6/005 |
| | | | | 362/607 |
| 2019/0039510 | A1* | 2/2019 | Chen | G09F 13/08 |

* cited by examiner

LIGHT-EMITTING HOUSING

CROSS-REFERENCE TO RELATED APPLICATION

This non-provisional application claims priority under 35 U.S.C. § 119(a) to Patent Application No. 107117821 filed in Taiwan, R.O.C. on May 24, 2018, the entire contents of which are hereby incorporated by reference.

BACKGROUND

Technical Field

The application relates to a light-emitting housing, and in particular, to a light-emitting housing that can improve light-emitting brightness.

Related Art

In the prior art, to make a housing more aesthetic and to increase attractiveness thereof for consumers to buy, a transparent pattern is provided on the housing, and light is emitted out of the housing by using a light source, so that the pattern is eye-catching.

For an arrangement, a pattern expected to be presented is usually generated on a housing by using a transparent region. Then, a position that is in the housing and that corresponds to the transparent region is provided with LED light bars that are arranged in a region in which light is to be emitted. If light is to be emitted in a large area, a proportion of a light-emitting area is usually increased in cooperation with a light guide plate. However, if excessively low light-emitting brightness appears, a conventional approach is reducing a resistance or increasing an LED density or brightness, to improve light emergence efficiency of an appearance pattern.

However, increasing an LED density or brightness requires consuming more electric energy, and more thermal energy is generated, resulting in a heat dissipation problem. In addition, reducing a resistance requires modifying an original circuit or adding electronic elements to the original circuit, and requires relying on continuous testing and correction of engineers, to reach required light-emitting brightness.

SUMMARY

In view of this, an embodiment of the application provides a light-emitting housing including a light-emitting module and a housing. The light-emitting module includes a light guide plate and at least one light-emitting unit. The light guide plate includes an upper surface, a lower surface, and a plurality of dot regions, the dot regions are located on the lower surface, and the at least one light-emitting unit provides a plurality of light beams incident to the light guide plate. The housing is disposed above the light-emitting module and located on the upper surface of the light guide plate, and the housing includes at least one transparent region. Some of the light beams emitted by the at least one light-emitting unit are reflected through the dot regions and penetrate the upper surface of the light guide plate and the at least one transparent region.

In this way, when passing through the dot region on the light guide plate, the light beams emitted by the light-emitting unit are reflected to the at least one transparent region, so that from the outside of the housing, the light beams penetrating the at least one transparent region can be observed, and a visual effect that a specific position on the housing emits light is generated.

In some embodiments, the light-emitting housing may further include a bottom plate and a thin film. The bottom plate is disposed below the light-emitting module. The thin film is attached, in an electrostatic adsorption manner, to the upper surface, opposite to which the dot regions are provided, of the light guide plate. After penetrating the light guide plate and being reflected to the bottom plate through the thin film, the some of the light beams emitted by the at least one light-emitting unit are reflected by the bottom plate and penetrate the light guide plate and the at least one transparent region again.

When being incident from a material having a refractive index to a material having another refractive index, light beams have a characteristic that some of the light beams perform penetration while some of the light beams are reflected. A thin film is disposed above the light guide plate, so that after reflected to the bottom plate through the thin film, the some of the light beams penetrating the light guide plate are reflected by the bottom plate and penetrate the light guide plate and the at least one transparent region again, to effectively improve light utilization, and improve a light emergence rate. Therefore, brightness of emergent light in the at least one transparent region may be improved without changing a resistance itself, increasing or modifying an LED quantity, changing a structure of the dot region of the light guide plate, and increasing power consumption.

In some embodiments, the thin film is a non-fully transparent thin film, and in some other embodiments, the thin film is a semi-transparent thin film. In this way, the light beams penetrating the light guide plate can be reflected to the bottom plate as many as possible, to increase light beams that are reflected by the bottom plate and incident to the at least one transparent region.

In some embodiments, the thin film may be a polyethylene (PE) thin film. Because a manufacturing technology of the PE thin film is mature, and different transparencies, thicknesses, or the like thereof can be obtained through adjustment according to requirements, an electrostatic adsorption effect is also easily generated, to achieve an effect that the PE thin film is easily attached to the light guide plate.

In some embodiments, the thin film completely covers the upper surface of the light guide plate. When being incident to the dot region, light beams are reflected. However, for light beams that are incident to a side, opposite to the dot region, of the light guide plate, they will penetrate the light guide plate and diverge. To effectively use all the light beams that are incident to the light guide plate, a thin film may be disposed on the light guide plate opposite to the dot region, the some of the light beams that originally penetrate the light guide plate and diverge are used again by using the thin film, to improve brightness of emergent light in the at least one transparent region without changing a resistance itself, increasing or modifying an LED quantity, changing a structure of the dot region of the light guide plate, and increasing power consumption. Further, the light beams may penetrate the light guide plate from any position on the upper surface of the light guide plate, and a position of the at least one transparent region may also be adjusted according to a requirement. For ease of use, the thin film may be covered on the entire upper surface of the light guide plate, to make light beams penetrating the light guide plate be reflected as many as possible, so as to increase a light emergence rate.

In some embodiments, the light-emitting housing further includes another thin film, and the another thin film is attached above the thin film in an electrostatic adsorption manner. The another thin film is further disposed above the original thin film, and the another thin film is removed when assembling is to be performed or after assembling is performed, to avoid that excessively many fingerprints or scratches are generated on the thin film, affecting a reflection or light emergence effect of the light beams.

In some embodiments, a UV coating is sprayed on the outer surface of the housing, and covers the at least one transparent region. The UV coating is sprayed, to make light beams penetrating the at least one transparent region diverge. When the light-emitting unit is not enabled, the position of the at least one transparent region is not easily perceived by naked eyes from the outside of the housing. However, after the light-emitting unit is enabled and emits light beams, the light beams may still penetrate the at least one transparent region, and penetrate the UV coating, so that a pattern presented when the light beams penetrate the at least one transparent region and make the at least one transparent region emit light can be observed from the outside of the housing.

In some embodiments, the UV coating is sprayed for a plurality of times in an overlapping manner until the at least one transparent region is completely shielded. When the sprayed UV coating is thicker, and when the light-emitting unit is not enabled, the at least one transparent region may achieve a relatively good effect of being hidden and shielded in the housing.

In some embodiments, the at least one transparent region of the housing includes an inner surface and an outer surface, the inner surface and the outer surface are provided opposite to each other. The inner surface is a concave surface and faces toward the light-emitting module. An uneven surface is formed on the outer surface. In this way, a pattern expected to be formed may be formed on the inner surface, and an uneven surface may be formed on the outer surface. When the uneven surface is formed on the outer surface, it may help the light beams originally reflected in parallel become light beams that diffuse, to provide a better light emergence effect.

In some embodiments, the uneven surface includes a texture structure. Based on the texture structure, the outer surface of the housing presents a matte surface, which is not easily perceived by naked eyes, but an effect of diffusion of light beams may be achieved.

In some embodiments, the at least one transparent region of the housing includes an inner surface and an outer surface, the inner surface and the outer surface are provided opposite to each other. The inner surface is a concave surface and faces toward the light-emitting module.

A smooth surface is formed on the outer surface. In this way, a pattern expected to be presented is formed on the inner surface, and the smooth surface may be formed on the outer surface. Because being relatively flat, the outer surface may still be even and flat after being coated with a UV coating, and is more aesthetic in a visual effect.

In some embodiments, the foregoing concave surface is formed on the inner surface by laser engraving. A relatively fine or complex pattern may be formed by laser engraving.

In conclusion, the light-emitting housing can effectively improve light utilization and improve a light emergence rate by disposing of the thin film. Therefore, brightness of emergent light in the at least one transparent region may be improved without changing a resistance itself, increasing or modifying an LED quantity, changing a structure of the dot region of the light guide plate, and increasing power consumption. In addition, the UV coating is sprayed on the outer surface of the housing, so that when the light-emitting unit is not enabled, the at least one transparent region has an effect of being hidden in the housing and being unable to be directly seen by naked eyes, but does not affect a penetration effect of light beams.

The following describes in detail features and advantages of the application in implementations. The content enables any person skilled in the art to know technical content of the application and implement the technical content. A person skilled in the art can easily understand the objectives and advantages of the application according to the content disclosed in this specification, the claims, and drawings.

DETAILED DESCRIPTION OF THE EMBODIMENTS

Figure 1:
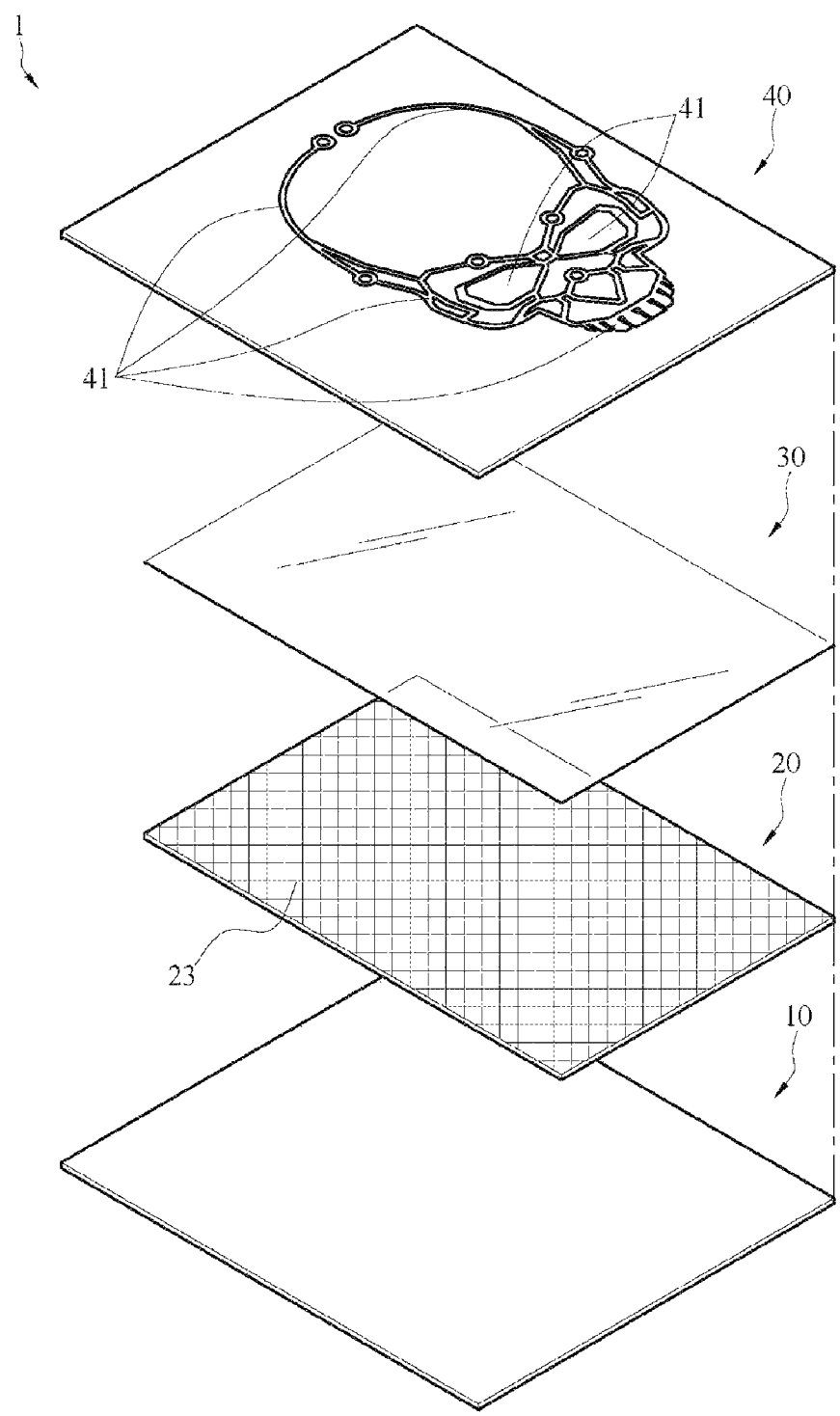
FIG. 1 is an exploded view of a light-emitting housing according to an embodiment of the application.
Figure 2:
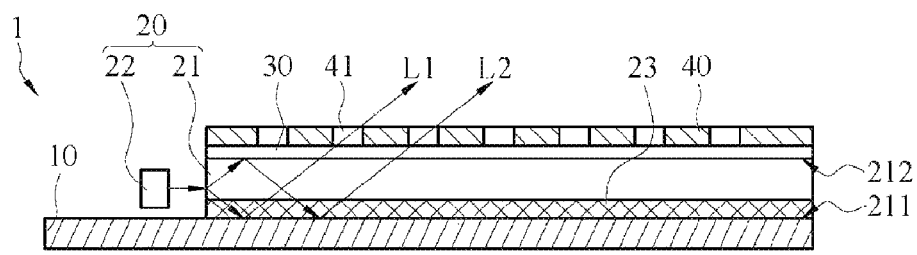
FIG. 2 is a partial sectional view of a light-emitting housing according to an embodiment of the application.

Referring to FIG. 1 and FIG. 2, FIG. 1 is an exploded view of a light-emitting housing according to an embodiment of the application, and FIG. 2 is a partial sectional view of a light-emitting housing according to an embodiment of the application. The light-emitting housing in this embodiment includes a bottom plate 10, a light-emitting module 20, a thin film 30, and a housing 40. In FIG. 2, the housing 40 disposed uppermost is omitted. The housing 40 may be an outer housing of any electronic component, for example, a display screen, a notebook computer, or a tablet computer, and a size and a shape of the housing 40 are not limited. In this embodiment, the size and the shape of the shown housing 40 are merely examples.

As can be learned from FIG. 1, the bottom plate 10 is disposed lowermost and configured to reflect a light beam. In some implementation aspects, to obtain a relatively good reflection effect, a white bottom plate may be used. The light-emitting module 20 is disposed above the bottom plate 10. The light-emitting module 20 includes a light guide plate 21 and at least one light-emitting unit 22. Referring to FIG. 2 together, the light guide plate 21 has a lower surface 211 and an upper surface 212, the inner surface 211 and the outer surface 212 are provided opposite to each other and a plurality of dot regions 23. The lower surface 211 is close to the bottom plate 10, and the upper surface 212 is close to the thin film 30. In this embodiment, the plurality of dot regions 23 is provided on the lower surface 211. A region in which the dot region 23 is provided may be selected and provided in accordance with a position of the transparent region of the housing 40 to which a light beam may be reflected.

The light guide plate 21 is provided with the plurality of dot regions 23, and the light-emitting unit 22 provides a plurality of light beams incident to the light guide plate 21.

In this embodiment, the light-emitting unit 22 is a plurality of LEDs (in FIG. 2, an example of only one LED on a left side edge of the light guide plate 21 is used for description) that is disposed along a side edge of the light guide plate 21. However, the application is not limited thereto. Alternatively, only one LED may be disposed. The used light-emitting unit is not limited to using an LED as a light source, and light-emitting components can be all used provided that they can emit light of a required color and strength. In addition, the light-emitting unit 22 may be disposed not only on a side edge of the light guide plate 21. Alternatively, a required quantity of light-emitting units 22 may be disposed on a plurality of side edges of the light guide plate 21.

In this embodiment, to make an entire pattern have relatively even brightness in a display effect, a dot density of the dot region 23 has a direct proportional relationship with a distance between the dot region 23 and the light-emitting unit 22. That is, when the distance between the dot region 23 and the light-emitting unit 22 is closer (that is, the dot region 23 is closer to the light-emitting unit 22), the dot region 23 has a smaller dot density (that is, dots has a density of a sparser distribution). When the distance between the dot region 23 and the light-emitting unit 22 is farther (that is, the dot region 23 is farther away from the light-emitting unit 22), the dot region 23 has a larger dot density (that is, dots has a density of a tighter distribution).

The thin film 30 is attached to a surface (that is, the upper surface 212 of the light guide plate 21), opposite to which the dot region 23 is provided, of the light guide plate 21 of the light-emitting module 20. Because the thin film 30 is used to re-reflect light beams that penetrate the light guide plate 21, to cause the thin film 30 to reflect light beams that penetrate the light guide plate 21 as many as possible, adhesive materials cannot be used between the thin film 30 and the light guide plate 21 for fixing or bonding. This is because materials such as glue may cause light beams to be diverged or scattered, and the light beams cannot be effectively used.

As can be learned from FIG. 1, the housing 40 is disposed above the light-emitting module 20 and is located on a side of the upper surface 212 of the light guide plate 21, and the housing 40 includes the transparent region 41. In this embodiment, description is provided by using an example in which a skull pattern is presented on the housing 40. Therefore, parts at a position of the skull pattern all belong to the transparent region 41, and a non-transparent material is used for other parts. For the transparent region 41, a fully-transparent manner or a semi-transparent manner may be used, so that a light beam is allowed to penetrate out of the transparent region 41.

Referring to FIG. 1 and FIG. 2 together, for ease of description of paths of light beams of different parts, in this embodiment, some of the light beams emitted by the light-emitting unit 22 are represented by light beams L1, and the other light beams are represented by light beams L2. In addition, to make the paths of the light beams clearer and for ease of description, only one light beam L1 and one light beam L2 are used for description. As can be learned from FIG. 2, the light beams L1 are reflected through the dot region 23, penetrate the upper surface 212 of the light guide plate 21, advance toward the housing 40, and then penetrate the transparent region 41. In this way, when observing from the outside of the housing 40, the transparent region 41 (that is, the skull region) presents a color of the light beams L1, so that the entire transparent region 41 on the housing 40 emits light and presents a visual effect of the skull pattern.

In addition, the light beams L2 penetrate the light guide plate 21 and are reflected to the bottom plate 10 through the thin film 30, and are reflected by the bottom plate 10 and penetrate the light guide plate 21 and the transparent region 41 again. In other embodiments, after being reflected to the dot region 23 through the thin film 30, some light beams L2 penetrating the light guide plate 21 may be reflected by the dot region 23 and penetrate the upper surface 212 of the light guide plate 21 and the transparent region 41 again. When being incident from a material having a refractive index to a material having another refractive index, light beams have a characteristic that some of the light beams perform penetration (not shown) while some of the light beams are reflected (such as the light beams L2). By using the characteristic, the thin film 30 is disposed above the light guide plate 21, and after reflected to the bottom plate 10 or the dot region 23 through the thin film 30, the some of the light beams L2 penetrating the light guide plate 21 are reflected by the bottom plate 10 or the dot region 23 and penetrate the light guide plate 21 and the transparent region 41 again, to effectively improve utilization of the light beams L2, and improve a light emergence rate. That is, the some of the light beams L2 that originally penetrate the upper surface 212 of the light guide plate 21 and diverge are used again by being reflected by the thin film 30 and the bottom plate 10, to improve utilization of the light beams L2 and increase a light emergence rate.

Therefore, brightness of emergent light in the transparent region 41 may be improved without changing a resistance itself, increasing or modifying an LED quantity, changing a structure of the dot region of the light guide plate, and increasing power consumption. A visual effect of light-emitting of a skull is made to be more obvious.

Figure 3:
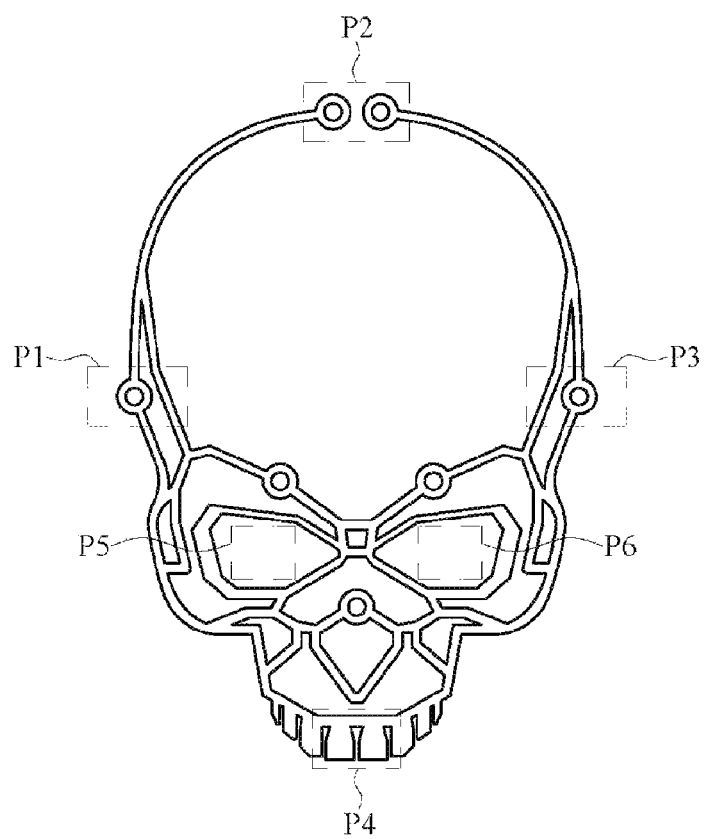
FIG. 3 is a schematic diagram of measurement points adopted by a light-emitting housing during a brightness test according to an embodiment of the application.

To prove that increasing of the thin film 30 may indeed improve brightness of emergent light in the transparent region 41, verification is also performed by using an experiment. A difference between a light-emitting housing in a contrast case and that in this embodiment lies in whether there is a thin film 30. In the contrast case, the light-emitting housing with no attached thin film is provided, in this embodiment, the light-emitting housing with an attached thin film is provided, and the remaining structures are all the same. A measurement manner is that after the light-emitting unit 22 is made to emit light, six measurement points of the transparent region 41 outside of the housing 40 are taken to perform measurement of brightness. Referring to FIG. 3, FIG. 3 is a schematic diagram of measurement points adopted by a light-emitting housing during a brightness test according to an embodiment of the application. During measurement of this experiment, six measurement points P1 to P6 in FIG. 3 are measured. A measurement result is shown in the following Table 1. As can be learned from the result in Table 1, compared with the contrast case in which no attached thin film is provided, in this embodiment in which the attached thin film 30 is provided, brightness measured at the measurement points is significantly improved. This proves that brightness of emergent light in the transparent region 41 may be improved by disposing the thin film 30 without changing a resistance itself, increasing or modifying an LED quantity, changing a structure of the dot region of the light guide plate, and increasing power consumption.

TABLE 1

| Measurement point | Contrast case-no attached thin film (Unit: nits) | Embodiment-attached thin film (Unit: nits) |
|---|---|---|
| P1 | 1.85 | 2.99 |
| P2 | 1.84 | 2.72 |
| P3 | 1.88 | 3.07 |
| P4 | 4.29 | 6.36 |
| P5 | 2.63 | 4.49 |
| P6 | 2.25 | 3.75 |

In this embodiment, the thin film 30 is a non-fully transparent thin film. The thin film 30 still has a transparent effect, but is not fully transparent and is of a non-fully transparent material that is slightly foggy instead. In this way, a refractive index different from that of the fully transparent light guide plate 21 is generated, and the light beams L2 penetrating the light guide plate 21 are reflected as many as possible to the bottom plate 10 or the dot region 23. In some implementation aspects, a semi-transparent thin film may be alternatively used.

In addition, in this embodiment, the thin film 30 is a polyethylene (PE) thin film. Because a manufacturing technology of the PE thin film is mature, and different transparencies, thicknesses, or the like may be obtained through adjustment according to requirements, an electrostatic adsorption effect is also easily achieved, to achieve an effect that the PE thin film is easily attached to the light guide plate 21.

Further, in this embodiment, the thin film 30 may completely cover the upper surface 212 of the light guide plate 21, and the dot region 23 is provided on the lower surface 211 of the light guide plate 21. Because the light beams L2 may penetrate the light guide plate 21 from a non-specific position of the light guide plate 21, and a position of the transparent region 41 may also be adjusted according to a requirement, making the thin film 30 completely cover the light guide plate 21 may make all light beams L2 be used as many as possible. In addition, it is also possible to dispose the thin film 30 only at a position corresponding to the transparent region 41 when brightness of the transparent region 41 is required to be improved. However, in this embodiment, considering convenience of manufacturing, grouping, and use, the thin film 30 covers the entire upper surface of the light guide plate 21, so that light beams L2 penetrating the light guide plate 21 can be reflected as many as possible to the bottom plate 10 or the dot region 23, to increase a light emergence rate, and improve light-emitting brightness of the transparent region 41.

In some implementation aspects, the light-emitting housing may further include another thin film (not shown), and the another thin film is attached above the thin film 30 in an electrostatic adsorption manner. The another thin film is further first disposed above the thin film 30 during manufacturing, and the another thin film is removed when assembling is to be performed or after assembling is performed, to avoid that excessively many fingerprints or scratches are generated on the thin film 30 due to assembly or taking, affecting a reflection or light emergence effect of the light beams.

In this embodiment, a UV coating (not shown) is sprayed on the outer surface of the housing 40, and covers the transparent region 41. By spraying the UV coating, light beams that are incident from the outside of the housing to the at least one transparent region 41 diffuse and diverge. Therefore, when the light-emitting unit 22 is not enabled, the transparent region 41 is made to have an effect of being hidden in the housing 40 and an effect that a position of the transparent region 41 is not easily perceived by naked eyes from the outside of the housing 40. However, after the light-emitting unit 22 is enabled and emits light beams, the light beams L1 and the light beams L2 may still penetrate the transparent region 41 and the UV coating covering above the transparent region 41, so that naked eyes can observe, from the outside of the housing 40, a pattern presented by light emitted by the transparent region 41. In this way, when the light-emitting housing 1 does not emit light, naked eyes cannot see the pattern (such as the skull shape located at the housing 40 shown in FIG. 1) presented by the transparent region, when the light-emitting housing 1 emits light, the pattern (such as the skull shape located at the housing 40 shown in FIG. 1) presented by the transparent region can be obviously seen, and based on a comparison result obtained through enabling or not enabling the light-emitting unit, a visual effect surprising a user may be generated.

In addition, in some implementation aspects, the UV coating is sprayed for a plurality of times in an overlapping manner till the transparent region 41 is completely shielded. When the sprayed UV coating is thicker, and when the light-emitting unit 22 is not enabled, a transparent region 41 may achieve a better effect of being hidden and shielded in the housing 40.

Figure 4:
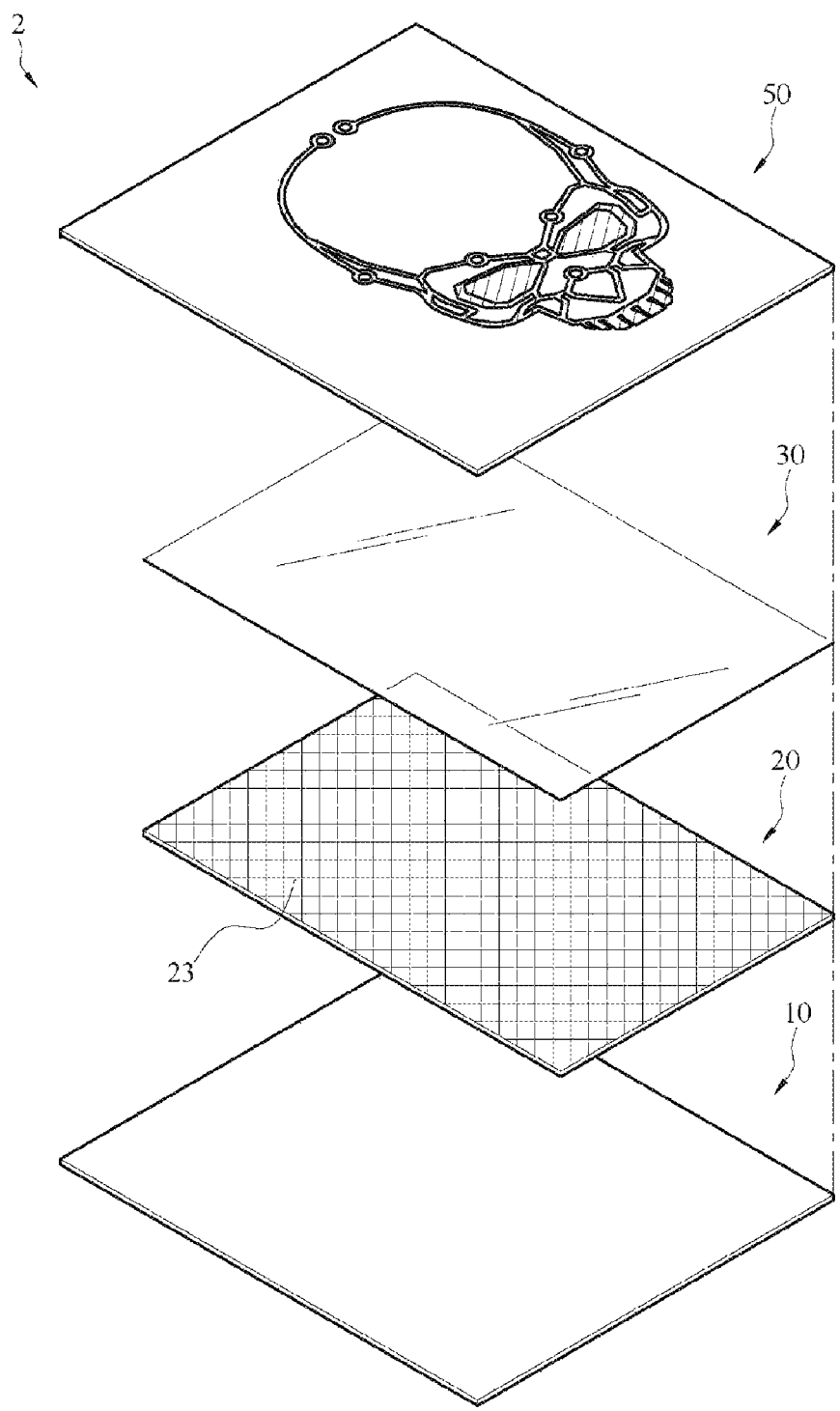
FIG. 4 is an exploded view of a light-emitting housing according to another embodiment of the application.
Figure 5:
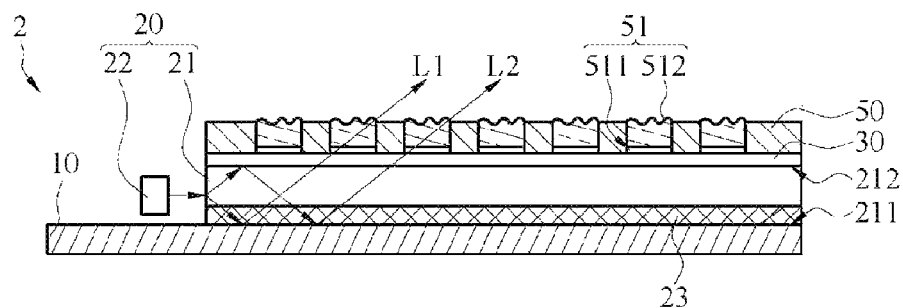
FIG. 5 is a sectional view of a light-emitting housing according to another embodiment of the application.

Next, referring to FIG. 4 and FIG. 5 together, FIG. 4 is an exploded view of a light-emitting housing according to another embodiment of the application, and FIG. 5 is a sectional view of a light-emitting housing according to another embodiment of the application. In this embodiment, components that are essentially the same as those in the previous embodiment are represented by using the same component symbols, and for the same or corresponding structures and link relationships, details are not described. A difference between the light-emitting housing 2 in this embodiment and the light-emitting housing 1 in the previous embodiment lies in a housing 50. In this embodiment, the housing 50 may be an outer housing of any electronic component, for example, a display screen, a notebook computer, or a tablet computer, and a size and a shape of the housing 50 are not limited. In this embodiment, the size and the shape of the housing 50 shown in the figure are merely examples.

As can be learned from FIG. 4, the transparent region 51 of the housing 50 includes an inner surface 511 and an outer surface 512, the inner surface 511 and the outer surface 512 are provided opposite to each other. In addition, referring to FIG. 5, the inner surface 511 is a concave surface and faces toward the light-emitting module 20. In this embodiment, the concave surface may be formed by laser engraving. Alternatively, a pattern required to be presented may be formed in another cutting manner. In this embodiment, the pattern expected to be formed (such as the skull shape located at the housing 50 shown in FIG. 4) is formed on the inner surface 511 by laser engraving according to a requirement.

In addition, an uneven surface may be formed on the outer surface 512 of the transparent region 51. When the uneven surface is formed on the outer surface 512, it may help the light beams originally reflected in parallel become light beams that diffuse, to provide a better light emergence effect. In this embodiment, the uneven surface may include a texture structure, where the texture structure may be a fine texture, and therefore the uneven structure is not excessively clear. The outer surface 512 of the housing 50 presents a matte surface by using the texture structure, which is not easily perceived by naked eyes, but an effect of diffusion of light beams may be achieved. In addition, a UV coating (not shown) is sprayed on the outer surface 512 once again. In this way, the uneven surface of the outer surface 512 may also be made to be hidden and shielded by using the UV coating, and visually, the outer surface 512 may be relatively flat and aesthetic.

Figure 6:
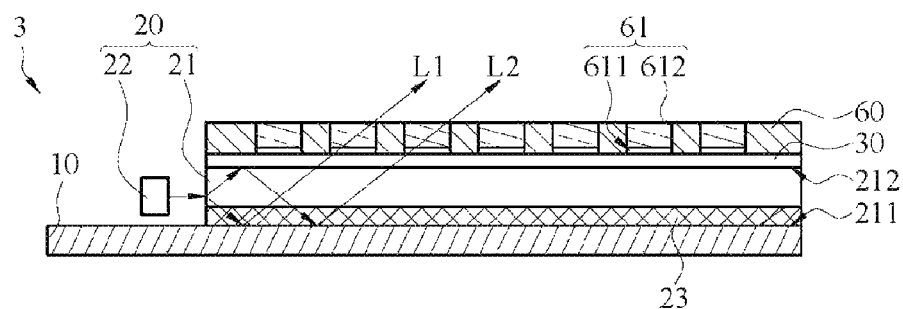
FIG. 6 is a sectional view of a light-emitting housing according to still another embodiment of the application.

Next, referring to FIG. 6, FIG. 6 is a sectional view of a light-emitting housing according to still another embodiment of the application. In this embodiment, components that are essentially the same as those in the foregoing another embodiment are represented by using the same component symbols, and for the same and corresponding structures and link relationships, details are not described. A difference between the light-emitting housing 3 in this embodiment and the light-emitting housing 2 in the second embodiment lies in a housing 60. In this embodiment, at least one transparent region 61 of the housing 60 includes an inner surface 611 and an outer surface 612, the inner surface 611 and the outer surface 612 are provided opposite to each other, the inner surface 611 is a concave surface and faces toward the light-emitting module 20, and a smooth surface is formed on the outer surface 612. Because the outer surface 612 is a smooth surface, the outer surface 612 may also be even and flat after the UV coating is sprayed on the outer surface 612, and is more aesthetic in a visual effect. In this embodiment, the concave surface of the inner surface 611 may be formed by laser engraving. Alternatively, a pattern required to be presented may be formed in another cutting manner. In this embodiment, a pattern expected to be formed is formed on the inner surface 611 by laser engraving in accordance with a requirement.

In conclusion, the light-emitting housing can effectively improve utilization of the light beams L2 and improve a light emergence rate by disposing of the thin film 30. Therefore, brightness of emergent light in the transparent region 41 may be improved without changing a resistance itself, increasing or modifying an LED quantity, changing a structure of the dot region of the light guide plate, and increasing power consumption. Further, the UV coating is sprayed on the outer surfaces of the housing 40, the housing 50, or the housing 60, so that when the light-emitting unit 22 is not enabled, the transparent region 41 may be made to have an effect of being hidden in the housing 40, the housing 50, or the housing 60 and being unable to be directly seen by naked eyes, but does not affect a penetration effect of the light beams L1 and L2.

Although the application is disclosed by using the embodiments, the embodiments are not used to limit the application. Any person skilled in the art can make some changes and improvements without departing from the spirit and scope of the application, and therefore the patent protection scope of the application is subject to the appended claims of the specification.

What is claimed is:

1. A light-emitting housing, comprising:
a light-emitting module, comprising a light guide plate and at least one light-emitting unit, wherein the light guide plate comprises an upper surface, a lower surface, and a plurality of dot regions, the dot regions are located on the lower surface, and the at least one light-emitting unit provides a plurality of light beams incident to the light guide plate; and
a housing, disposed above the light-emitting module and located on the upper surface of the light guide plate, and the housing comprises at least one transparent region, wherein some of the light beams emitted by the at least one light-emitting unit are reflected through the dot regions and penetrate the upper surface of the light guide plate and the at least one transparent region, and a UV coating is sprayed on an outer surface of the housing, covers the at least one transparent region and makes the position of the transparent region is not easily perceived by naked eyes from the outside of the housing when the light-emitting unit is not enabled.

2. The light-emitting housing according to claim 1, further comprising:
a bottom plate, disposed below the light-emitting module; and
a thin film, attached, in an electrostatic adsorption manner, to the upper surface, opposite to which the dot regions are provided, of the light guide plate, wherein after penetrating the light guide plate and being reflected to the bottom plate through the thin film, the some of the light beams emitted by the at least one light-emitting unit are reflected by the bottom plate and penetrate the light guide plate and the at least one transparent region again.

3. The light-emitting housing according to claim 2, wherein the thin film is a non-fully transparent thin film.

4. The light-emitting housing according to claim 2, wherein the thin film is a semi-transparent thin film.

5. The light-emitting housing according to claim 3, wherein the thin film is a semi-transparent thin film.

6. The light-emitting housing according to claim 2, wherein the thin film is a polyethylene (PE) thin film.

7. The light-emitting housing according to claim 2, wherein the thin film completely covers the upper surface of the light guide plate.

8. The light-emitting housing according to claim 2, further comprising another thin film, attached above the thin film in an electrostatic adsorption manner.

9. The light-emitting housing according to claim 1, wherein the UV coating is sprayed for a plurality of times in an overlapping manner till the at least one transparent region is completely shielded.

10. The light-emitting housing according to claim 1, wherein the at least one transparent region of the housing comprises an inner surface and an outer surface, the inner surface and the outer surface are provided opposite to each other, the inner surface is a concave surface and faces toward the light-emitting module, and an uneven surface is formed on the outer surface.

11. The light-emitting housing according to claim 10, wherein the uneven surface comprises a texture structure.

12. The light-emitting housing according to claim 1, wherein the at least one transparent region of the housing comprises an inner surface and an outer surface, the inner surface and the outer surface are provided opposite to each other, the inner surface is a concave surface and faces toward the light-emitting module, and a smooth surface is formed on the outer surface.

13. The light-emitting housing according to claim 10, wherein the concave surface is formed on the inner surface by laser engraving.

14. The light-emitting housing according to claim 12, wherein the concave surface is formed on the inner surface by laser engraving.

* * * * *